(12) United States Patent
Tuzhilin et al.

(10) Patent No.: US 6,292,797 B1
(45) Date of Patent: Sep. 18, 2001

(54) METHOD FOR DETERMINING ACTIONABLE PATTERNS IN A DATABASE

(75) Inventors: Alexander S. Tuzhilin, New York, NY (US); Gediminas Adomavicius, Jersey City, NJ (US)

(73) Assignee: New York University, New York, NY (US)

( * ) Notice: Subject to any disclaimer, the term of this patent is extended or adjusted under 35 U.S.C. 154(b) by 0 days.

(21) Appl. No.: 09/130,844

(22) Filed: Aug. 6, 1998

Related U.S. Application Data

(60) Provisional application No. 60/055,005, filed on Aug. 7, 1997.

(51) Int. Cl.$^7$ ............................................. G06F 17/30
(52) U.S. Cl. ........................... 707/6; 707/3; 707/102; 707/203
(58) Field of Search ........................ 707/6, 102, 10, 707/3, 203

(56) References Cited

U.S. PATENT DOCUMENTS

| | | | |
|---|---|---|---|
| 5,325,466 | * 6/1994 | Kornacker | 395/77 |
| 5,572,604 | * 11/1996 | Simard | 382/224 |
| 5,581,634 | * 12/1996 | Heide | 382/226 |
| 5,586,240 | * 12/1996 | Khan et al. | 395/769 |
| 5,659,743 | * 8/1997 | Adams et al. | 395/621 |
| 5,731,986 | * 3/1998 | Yang | 364/491 |
| 5,764,974 | * 6/1998 | Walster et al. | 707/6 |
| 5,774,576 | * 6/1998 | Cox et al. | 382/160 |
| 5,794,239 | * 8/1998 | Walster et al. | 707/6 |
| 5,809,499 | * 9/1998 | Wong et al. | 707/6 |
| 5,832,182 | * 11/1998 | Zhang et al. | 707/10 |
| 5,857,169 | * 1/1999 | Seide | 704/256 |

OTHER PUBLICATIONS

Hambaba, Intelligent Hybrid System for Data Mining, IEEE Catalog No. 96TH8177, p. 111, Mar. 1996.*

Kamber et al. Generalization and Decision Tree Induction: Efficient Classification in Data Mining, IEEE, pp. 111–120, Apr. 1997.*

Yongjlan, Data Mining, IEEE, pp. 18–20, 1997.*

Tuzhilin et al., "A Belief–Driven Discovery Framework Based on Data Monitoring and Triggering," Center for Research on Inform Dec., 1996, pp. 1–23.

T. Imielinski et al., "DataMine: Application Programming Interface and Query Language for Database Mining", Systems for Mining Large Databases, KDD–96, pp. 256–261.

(List continued on next page.)

Primary Examiner—Thomas Black
Assistant Examiner—Frantz Coby
(74) Attorney, Agent, or Firm—Baker Botts L.L.P.

(57) ABSTRACT

A user specifies a hierarchical action tree via user input device and user interface element. The action tree is arranged in a tree of file directories, with each node of the tree corresponding to a file directory (or path). The user then specifies classes of patterns assigned to each node (directory) of the tree using data mining queries or pattern templates. Once the system is so initialized, the pattern templates and data mining queries are executed, retrieving the patterns specified by the user from a database. The retrieved patterns assigned to a node of the tree are then stored in a file in the corresponding file directory. The user may now act on the discovered patterns and use the organized file structure. A pattern discovery optimization element periodically checks if the database has changed substantially, and if it has re-executes the data mining queries and pattern templates which update the contents of the file structure accordingly.

26 Claims, 4 Drawing Sheets

OTHER PUBLICATIONS

Han et al., "DMQL: A Data Mining Query Language for Relational Databases", Database Syetems Research Laboratory, pp. 27–33.

Agrawal et al., "Fast Discovery of Association Rules", pp. 307–328.

Klemettinen, "Finding Interesting Rules from Large Sets of Discovered Association Rules", University of Helsinki, pp. 1–7.

Silberchatz et al., "What Makes Patterns Interesting in Knowledge Discovery Systems", pp. 1–13.

Shen et al., "Metaqueries for Data Mining", pp. 375–397.

Matheus et al., "Selecting and Reporting What is Interesting: The Kefir Application to Healthcare Data", Advances in Knowledge Discovery and Data Mining, AAAI/MIT Press, 1995, pp. 401–419.

Agrawal et al., "Mining Association Rules between Sets of Items in Large Databases", IBM Almaden Research Center, pp. 207–216.

Silberschatz et al., "On Subjective Measure of Interestingness in Knowledge Discovery", pp. 275–281.

Piatesky–Shapiro et al., "The Interestingness of Deviations", AAA1–94 Workshop on Knowledge Discovery in Databases, KDD–94, pp. 25–36.

* cited by examiner

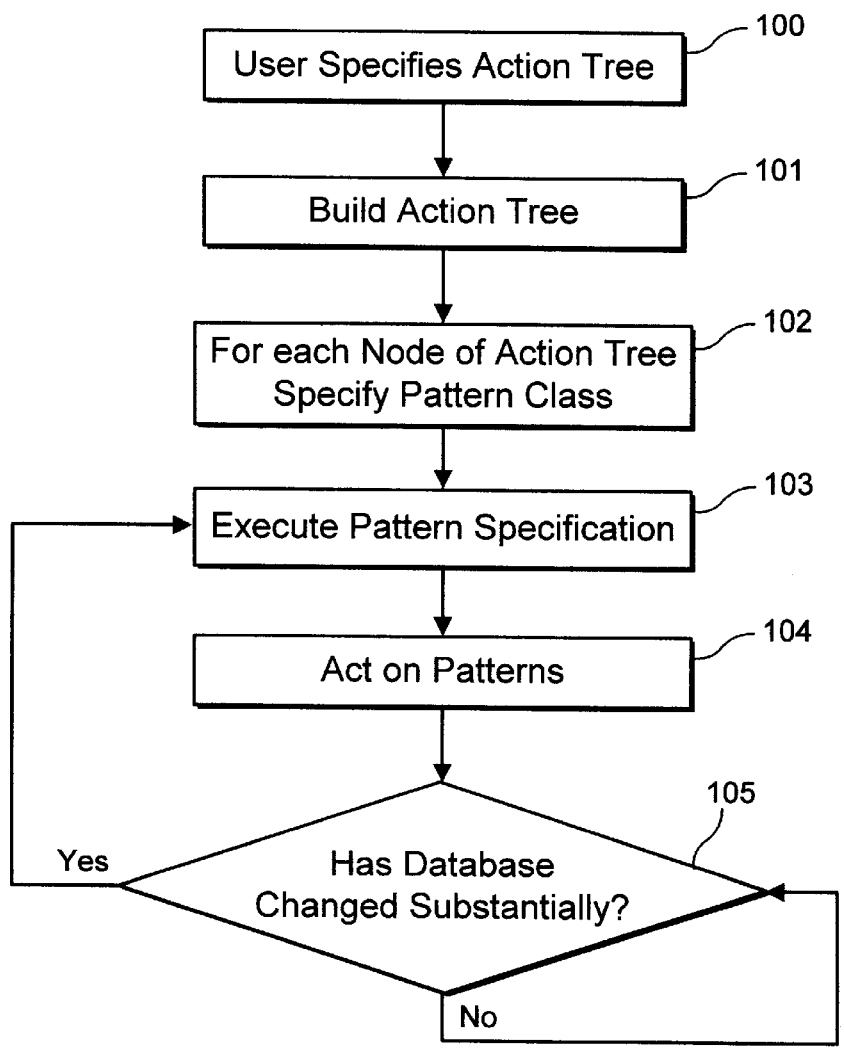
F I G. 2
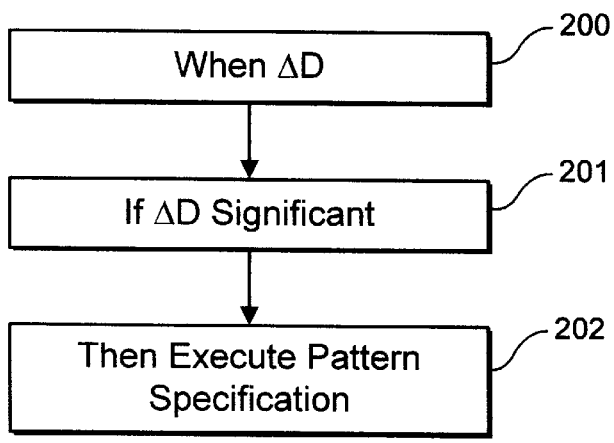
F I G. 3

METHOD FOR DETERMINING ACTIONABLE PATTERNS IN A DATABASE

The present application claims the benefit, under 35 U.S.C. section 119(e), of U.S. Provisional Application No. 60/055,005, filed Aug. 7, 1997.

BACKGROUND INFORMATION

This invention relates to a method for organizing, updating and helping determine which "patterns" or associations amongst data in a database are of interest to a user of the database.

One of the central and most basic problems in the field of "knowledge discovery" is that of determining which patterns or associations amongst data in a database are of interest to a user of the database. As the literature has stated (see, e.g., G. Piatetsky-Shapiro and C. J. Matheus, "The Interestingness of Deviations," *Proceedings of the AAAI-94Workshop on Knowledge Discovery in Databases*, 25–36, 1994) one way of gauging a user's interest in a pattern, particularly in a business context, is to determine whether and how a user wishes to act on a pattern. Patterns that satisfy this criterion are called "actionable" patterns. G. Piatetsky-Shapiro and C. J. Matheus, *"The Interestingness of Deviations,"* Proceedings of the AAAI-94 Workshop on Knowledge Discovery in Databases, 25–36, 1994; A. Silberschatz and A. Tuzhilin, "On subjective measures of Interestingness in knowledge discovery," *Proceedings of the First International Conference on Knowledge Discovery and Data Mining*, Montreal, Canada, August, 1995.

For example, consider a retail outlet or supermarket which wants to maximize its profit. In order to do so, it may want to take certain promotional, advertising or inventory stocking measures in response to certain facts (i.e., reflected as patterns or associations in the supermarket's database). For example, if a supermarket's database reflects that more of its customers now have children age six or under, and the database also reflects the fact that such customers in the past have bought more sweets, the supermarket will likely wish to stock up on sweets. But in order for the supermarket to be able to act on such information, it must be able to: (1) specify such associations between facts of import to it (i.e, specify which patterns are of interest); (2) associate such patterns with actions the supermarket would like to take in the event such patterns (associations of facts) arise; (3) periodically check, in for example a database, to determine whether such interesting patterns have in fact arose, and if so, act upon them; and (4) periodically update and change the supermarket's database to reflect the emergence of new facts and the disappearance of old ones.

These are difficult tasks. In particular, listing all possible actions for a given application and associating these actions with various patterns may be a huge endeavor. There may be many different actions for a given application, and it can be difficult (or even impossible) to list all of them in advance. In addition, even if all possible actions are listed, the actions still have to be assigned to various groups of patterns, and this can also be an overwhelming task.

In addition, periodically checking a database to determine whether user-specified patterns of interest have in fact arose can involve large computational resources.

Thus, what is needed is a method for allowing a database user to specify a potentially large number of (1) interesting patterns in the database, (2) actions to take in response, (3) and associations between the actions and patterns in an easy, efficient and intuitive manner. The method should also provide a way to determine whether new user-specified patterns of interest have arose so that on the one hand the system (and therefore the user) knows whenever new patterns satisfying the user-specified criterion have emerged, but on the other hand, time and computational resources are spared to the greatest degree possible.

OBJECTS AND ADVANTAGES

The present invention satisfies these needs. First, it allows a user to specify an "action hierarchy" which determines a set of possible actions in an application in an hierarchical way through an action/sub-action relationship. Thus, all possible actions for a given application need not be specified individually. Rather, actions may be specified in a structured, hierarchical manner in stages, with categories of action and individual actions represented by nodes in a tree. This allows the user to specify actions in an intuitive, top-down manner.

Second, the invention incorporates useful methods already known in the art for specifying interesting patterns.

Third, the invention provides a simple method to associate such patterns with respective nodes of the "action hierarchy" described above. The easy to use file organization of modern operating systems may, for example, be used for this purpose.

Finally, the invention provides a method of automatically determining whenever changes in the database are meaningful, and altering the pattern results accordingly. With this method, emerging patterns of interest are immediately discovered, but at the same time computational resources are optimized.

Thus, one object of the present invention is to help in determining which "patterns" or associations amongst data in a database are of interest to a user of the database in an efficient, intuitive manner.

Another object of the present invention is to provide an easy to maintain system which provides a user with actions to perform based on changes in patterns of underlying facts reflected in a database.

Still another object of the present invention is to allow easy, intuitive input of the actions by a user when the system is initially set up.

Still another object of the invention is to check for such changes in patterns only when necessary, so that computational and other resources are spared.

Further objects and advantages of the present invention will become apparent upon a review of the more detailed description set forth below.

BRIEF DESCRIPTION OF DRAWINGS

FIG. 2 is a flow chart depicting an overview of one possible embodiment of the method of the present invention.

FIG. 3 depicts an extended trigger which is one implementation of the steps of checking whether the database has changed substantially and executing a pattern specification in the event the condition is satisfied depicted in FIG. 2.

DESCRIPTION OF THE INVENTION

Figure 1:
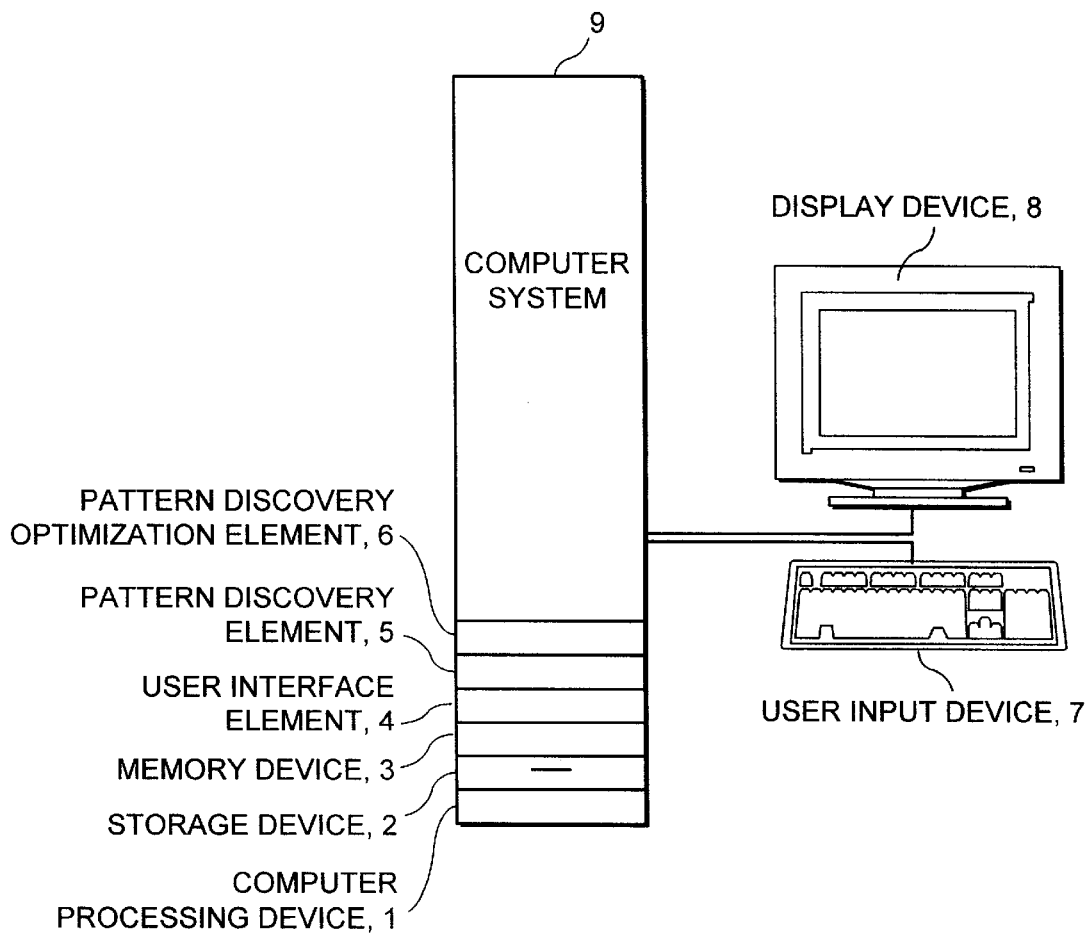
FIG. 1 shows one possible apparatus implementing an embodiment of the present invention.

FIG. 1 shows the apparatus of one embodiment of the present invention. A computer system 9 comprises a computer processing device 1, a storage device 2, a memory device 3, a user interface element 4, a pattern discovery element 5, a pattern discovery optimization element 6, a display device 8, and a user input device 7. The computer processing device 1 can be implemented with, for example, a single microprocessor chip (such as an Intel Pentium chip), printed circuit board, several boards or other device. The storage device 2 can be implemented with, for example, a hard disk, Tape Cartridges, or CD-ROM. In the presently described embodiment, the storage device 2 is assumed to have on it any stored database of relevant rules and facts. The memory device 3 can be implemented with, for example, a collection of RAM chips. The display device 8 can be implemented with any display, such as a monitor, whether analog or digital. The user input device 7 can be implemented with, for example, a keyboard, mouse or scanner. The computer system 9 also includes 1 user interface element 4, pattern discovery element 5 and pattern discovery optimization element 6 which can be implemented as separate "software" (i.e., programs, processes) whose instructions are executed by the computer processing device 1. However, there is no reason the computer processing device 1 (e.g., microprocessor chip) could not include the user interface element 4, pattern discovery element 5 and pattern discovery optimization element 6 processes itself.

FIG. 2 is a flow chart depicting an overview of one possible embodiment of the method of the present invention.

In Step 100, a user at computer system 9 specifies an action tree via user input device 7 and user interface element 4. The user interface element 4 may be a menu, form or other element displayed on display device 8 which facilitates easy, intuitive input from the user.

Once input, in Step 101, the action tree may be * represented utilizing a variety of implementations. For example, the action tree may be represented as a tree of directories on the storage device 2 labeled in accordance with user specifications.

In Step 102, at the computer system 9 the user specifies pattern classes for each node of the action tree again via a user input device 7 and user interface element 4.

Once the system is so initialized, in Step 103 the pattern discovery element 5 finds associated rules in the database on the storage device 2 which are instances of the pattern classes specified by the user in Step 102. The instances of the pattern classes are stored in file directories on the storage device 2 representing the nodes of the action tree to which the user has assigned the respective pattern classes.

Then, it becomes a simple matter for the user to utilize a now organized file structure (pattern files located in a tree structure of directories) to determine what interesting patterns have emerged—again the interestingness depending on the user specifications performed in Step 102—and how to act based on those patterns (Step 104).

However, the present embodiment assumes that the underlying database of facts and rules on the storage device 2 from which the interesting patterns were ascertained is constantly changing and updated to reflect reality, as a separate independent process. Perhaps word processing personnel whose job it is to maintain the database input relevant events daily via the input device 7. Or perhaps stocking personnel at a supermarket use a bar code scanner to scan new inventory data into the database. Whatever the means of updating the database, in Step 105, a pattern discovery optimization element 6 periodically checks whether the database has changed "substantially" (i.e., substantially with reference to the user specified pattern classes). If, and only if, the database has changed "substantially," the pattern discovery optimization element returns the processing path to Step 103, thus creating a new structure of organized pattern files, and reiterating the steps in the presently described embodiment from that point.

A more detailed description of the above described method is set forth as follows.

As noted above, the method described begins with Step 100, in which a user at computer system 9 specifies actions via user input device 7 and user interface element 4 as follows. The user interface element 4 may be a menu, form or other element displayed on display device 8 which facilitates easy, intuitive input from the user. Once the user specifies actions, the processing device 1 may assign each respective specified action to a file directory arranged in the same hierarchical manner as the user specified actions, for example by labeling or naming a directory with an action name. Thus, the action tree can be conceptualized as a group of file directories on the storage device 2 organized in a tree structure such that each node of the tree is a file directory corresponding to a given action or category of actions.

To illustrate one example of the present embodiment, consider again a supermarket. The supermarket maintains a customer purchase database on the storage device 2 of a computer system 9, such as the various items (Stock Keeping Units—"SKU") purchased by customers, promotions data as well as demographic data on the customers. More specifically, this database may include information about each item sold, such as the SKU number, brand name, category manufacturer, price, and quantity sold; information about promotions of a product, such as was the item on sale, was it purchased with a coupon, and was it a manufacturer's or a store coupon; information about the date and the time when the item was purchased; information about the customer who purchased the item, such as age, gender, race, income, number of children, household size, education, occupation and kitchen appliances that the customer owns.

Given this data, a supermarket store manager can take various actions based on patterns in the data. These actions can be organized and specified hierarchically. For example the store manager can take the following categories of actions: product stocking actions, promotion related action, customer related actions, advertising actions, etc. These broad classes of actions can be further subdivided into more specific actions (sub-actions). For example, product stocking actions can be subdivided into determining what products to buy for the supermarket and how to arrange products in the store, and these sub-actions can be divided into even finer actions. The action of determining what products to buy for the supermarket can be divided into actions based on selling statistics, actions based on season and actions based on customer demographics, etc.

Thus, a user can specify an action tree in steps, in iterative fashion and in a top down manner. A fragment of such an action tree that may be specified by the manager of a supermarket is set forth in FIG. 5.

Once specified, in the presently described embodiment, the action tree can be represented as a tree of file directories on the storage device 2 of the computer system 9 with each directory reflecting a node of the action tree corresponding to an action or category of actions.

Note that in alternative embodiments, the action hierarchy can also be conceptualized as a directed acyclic graph (DAG), a construct well known in the art. In particular, note that some categories of action may have common sub-actions, implying a DAG representation. However, although the DAG representation is theoretically more general than the tree representation, the tree representation described above is preferable for many applications as a convenient implementation using the operating system and file directory facilities of modern computer systems 9. In addition, and again on a more conceptual note, a tree design may seem more intuitive for many users in most contexts. Finally, note that a tree representation also has advantages in that it can effectively duplicate any DAG representation by replacing any DAG node with multiple parent nodes with multiple nodes with a single parent instead.

Turning again to FIG. 2, as noted above, in Step 101, the action tree may be represented utilizing a variety of implementations. For example, the action tree may be represented as a tree of directories on the storage device 2 labeled in accordance with user specifications. This representation is accomplished through a creation of file directories (corresponding to the user-specified actions, for example, by naming conventions or by file contents in the directories) using the facilities of whatever operating system (e.g., Unix, Windows) is running off the processing device 1 of the computer system 9. It should be apparent to one of ordinary skill in the art how the data obtained from user interface element 4 and modern operating system facilities may be used to create such a representation.

In Step 102, the computer system 9 user specifies pattern classes for each node of the action tree representation again via a user input device 7 and user interface element 4. A more detailed description of this step follows.

In this step, a user may, via user interface element 4, assign individual patterns to various nodes of the tree, thus declaring these patterns to be actionable (in terms of the action of the corresponding node). For example, patterns can be expressed as "association rules." R. Agrawal, T. Imielsky, and A. Swami, "Mining Association Rules Between Sets of Items in large Databases," *Proceedings of ACM SIGMOD Conference*, pages 207–216, 1993; R. Agrawal, H. Mannila, R. Srikant, H. Toivonen, and A. I. Verkamo, "fast Discovery of Association Rules," *Advances in Knowledge Discovery and Data Mining*, chap. 12, AAAI Press, 1996. For example, the user can assign the following association rule to the action tree (see. e.g., FIG. 5) node representing "(Determining what and when to buy) Based on Customer Demographics":

Children=YES and ChildrenAgeLess6= YES→CategorySweets=YES (0.01, 0.55).

This association rule specifies a pattern indicating the extent to which families with children younger than six years old buy sweets. A user would likely specify the pattern is actionable (i.e., assigned to the node described above) for a supermarket's management because management may use it for sweets buying decisions.

However, the problem with specifying individual patterns to various nodes of the tree is that the user may have to assign many patterns to specific nodes of the action tree. This may be a time consuming and even overwhelming task. Therefore an often more preferable alternative is for the user to assign classes of patterns (i.e., use a general description facility to specify more than one pattern) for each node of the action tree built in Step 101.

One way of specifying such classes of patterns is with the use of "data mining queries." See T. Imielinski, A. Virmani, and A. Abdulghani, "DataMine: Application Programming Interface and Query Language for Database Mining," *Proceedings of the Second International Conference on Knowledge Discovery and Data Mining*, August 1996; J. Han, Y. Fu, W. Wang, K. Koperski, and O. Zaiane, "DMQL: A Data Mining Query Language for relational Databases," *Proceedings of the SIGMOD Workshop in Research Issues on Data Mining and Knowledge Discovery*, Montreal, June 1996; W. M. Shen, K. L. Ong, B. Mitbander, and C. Zaniolo; "Metaqueries for Data Mining," *Advances in Knowledge Discovery and Data Mining*, chap. 15, AAAI Press, 1996. Any pattern description language or any data mining query language can be used to specify patterns and data mining queries. For example, T. Imielinski, A. Virmani, and A. Abdulghani, "DataMine: Application Programming Interface and Query Language for Database Mining," *Proceedings of the Second International Conference on Knowledge Discovery and Data Mining*, August 1996 introduced "M-SQL" for association rule discovery which is based on SQL modified with additional data mining operators. The present embodiment does not depend on any specific language.

However, as an example, consider the following request: "Find all rules in customer purchase data specifying which product categories the customers with children of various ages are buying." This request can be expressed in M-SQL as:

SELECT *
   FROM Mine(CustomerPurchaseData) R
   WHERE R.Body<{(Children=*), (ChildrenAgeLess6=*),
     (ChildrenAge6to12=*), (ChildrenAgeMore12=*)} and
     {(Children=*)}<R.Body and R.Consequent IN
     {(CategorySweets=*), (CategoryCereal=*),
     (CategoryFruit=*)} and R.Confidence>=0.5 and
     R.Support>=0.01.

This data mining query discovers association rules if and only if they satisfy certain criteria. First, the association rules must include the fields Children, ChildrenAgeLess6, ChildrenAgre6to12, ChildrenAgeMore12 of the table CustomerPurchaseData in the body of the rule. Second, the attribute Children must necessarily be present (this is specified by R. Body). Third, the discovered patterns must have one of the fields CategorySweets, CategoryCereal or CategoryFruit as a consequent of the rule (specified by R.Consequent). Finally, the discovered patterns must satisfy certain thresholds measuring statistical significance (i.e., R.Confidence and R.Support).

Thus, this data mining query specifies a set of patterns. Included in this set are patterns indicating: (1) the extent to which families with children younger than six years old buy sweets, (2) the extent to which families with children older than 12 years old buy sweets, (3) the extent to which families with children older than 12 years old buy fruit, and so on. Therefore, the pattern specified by the association rule Children=YES and ChildrenAgeLess6= YES→CategorySweets=YES (0.01, 0.55)

noted above is also one of the patterns specified by the data mining query.

"Pattern Templates" are another way of specifying classes (or another form of data mining queries). M. Klemmettinen, H. Mannila, P. Ronkainen, H. Toivonen, and A. I. Verkamo, "Finding Interesting Rules for Large Sets of Discovered Association Rules," *Proceedings of the Third International Conference on Information and Knowledge Management*, December, 1994. For example, a pattern template may be written as follows Children and ChildrenAge *→Category(0.01,0.5)

where ChildrenAge and Category are generalizations of attributes. Thus, if ChildrenAge specifies the set of attributes {ChildrenAgeLess6, ChildrenAge6to12, ChildrenAgeMore12} and Category specifies the set of attributes {CategorySweets, CategoryCereal, CategoryFruit}, then this pattern template specifies the same patterns as the earlier data mining query.

Additional examples of data mining queries expressed in pattern template language are as follows.

1. For an action node "Based on Customer Demographics" (see, e.g., FIG. 5), the pattern template: Age and Gender and Race and Income>Product (0.01, 0.5) will find sales patterns related to age, gender race and income.
2. Also for the action node "Based on Customer Demographics," the pattern template: KitchenAppliances+→Product(0.01, 0.7) indicates dependancies between kitchen appliances owned and products purchased.
3. For the action node "Based on Season" the pattern template: MonthofPurchase>Product (0.02, 0.6) will find product sales patterns based on the time of year.
4. Also for the action node "Based on Season" the pattern template: DayofWeek>Category+(0.01, 0.4) will find what types of product categories sell on different days of the week.
5. For the action node "Determine How to Arrange Products In the Store" the pattern template Category+→Category+ (0.01, 0.5) will find "cross-selling" categories of products, that is, those that are selling together.

Thus, each node of the action tree may have one or several data mining queries (or pattern templates) assigned to it. To illustrate, consider a node in the action tree (e.g. a file directory) named "(Determine what to buy) Based on Customer Demographics" (see FIG. 5 for illustration). A supermarket manager might assign the above pattern template (or equivalent data mining query) to this node because the patterns discovered would provide insights regarding product stocking. The directory would then contain files with the corresponding data mining query, pattern template or association rule. The action tree and the associated patterns they specify are then represented in an intuitive, easily modified manner.

Once the system is so initialized, then in Step 103 of FIG. 2., the pattern discovery element 5 traverses the whole action tree (say using a depth first search) and executes each of the data mining queries (or pattern templates) assigned to 201 the nodes of the tree. Thus, in so doing, the pattern discovery element 5 generates associated rules which are instances of the pattern classes specified by the user in Step 102 and may store them in, for example, a database on the storage device 2. The instances of the pattern classes are stored in files in file directories on the storage device 2 representing the nodes of the action tree to which the user has assigned the respective pattern classes.

Figure 5:
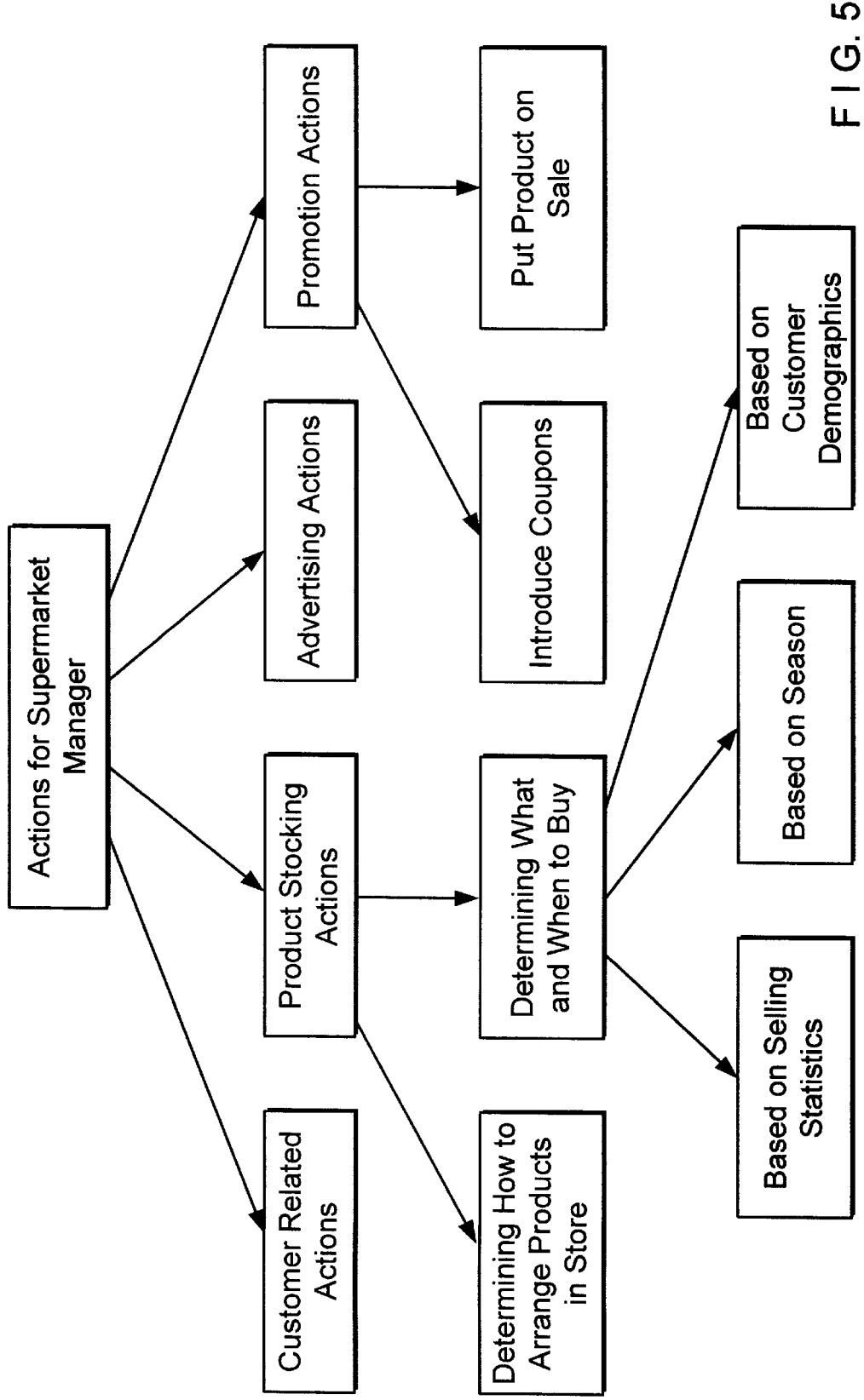
FIG. 5 depicts a fragment of an action tree which may be used by the manager of a supermarket.

For example, consider a file directory on the storage 2 device named "DHTAPITS," an abbreviation for "Determining How To Arrange Products in the Store," a possible node of an action tree (see, e.g., FIG. 5). For each pattern template, a single file might be stored in the directory which could include the pattern template assigned to the DHTAPITS node as well the results obtained from execution of the pattern template. The contents of this file might look as follows:

[PATTERN TEMPLATE]
    Category+>Category+(0.01, 0.5)
[TABLE]
    CustomerPurchaseData
DISCOVERED ACTIONABLE PATTERNS
    CategoryHam→CategoryBread (0.01, 0.79)
    CategoryMeat→CategoryVegetables (0.03, 0.62)
    CategoryCereal→CategoryMilk (0.02, 0.58)
    CategoryMeat AND CategoryVegetables>CategoryBread (0.015, 0.53)

Once the action tree of directories is loaded with such files for each node of the tree, then in Step 104, it becomes a simple matter for a user to utilize a now organized file structure to determine what patterns of interest have emerged and how to act based on those patterns.

However, the presently described embodiment assumes that the underlying database of facts and rules on the storage device 2 from which the interesting patterns were determined is constantly updated to reflect reality, as a separate independent process. Perhaps word processing personnel whose job it is to maintain the database input relevant events daily via the input device 7. Or perhaps stocking personnel at a supermarket use a bar code scanner to scan new inventory data into the database. However the database is updated, it is constantly changing.

Thus, the executable pattern templates or data mining queries assigned to the nodes of the action tree must me executed periodically to obtain newly emerging patterns. Accordingly, the issue arises as to when and how often the data mining queries and pattern templates should be executed.

One response to this question is to re-execute all pattern templates and data mining queries as often as possible. The problem with this solution is that the data mining execution process will often involve extensive computational resources. This is an especially important consideration when the application involves a large, complex action tree.

Another response to this problem is to re-execute pattern templates and data mining queries whenever the database changes or is updated. However, the database changing does not necessarily imply that the associations of facts (patterns) discovered by the user specified pattern templates or data mining queries has changed. Thus what is important is determining whether the database has changed with respect to the patterns of interest to the user.

Accordingly, in the present described embodiment, in Step 105, a pattern discovery optimization element 6 periodically checks whether the database has changed "substantially" (i.e. substantially with reference to the user specified pattern classes). If, and only if, the database has changed "substantially," the pattern discovery optimization element 6 returns the processing path to Step 103, thus creating a new structure of organized pattern files, and reiterating the steps in the presently described embodiment from that point.

Figure 4:
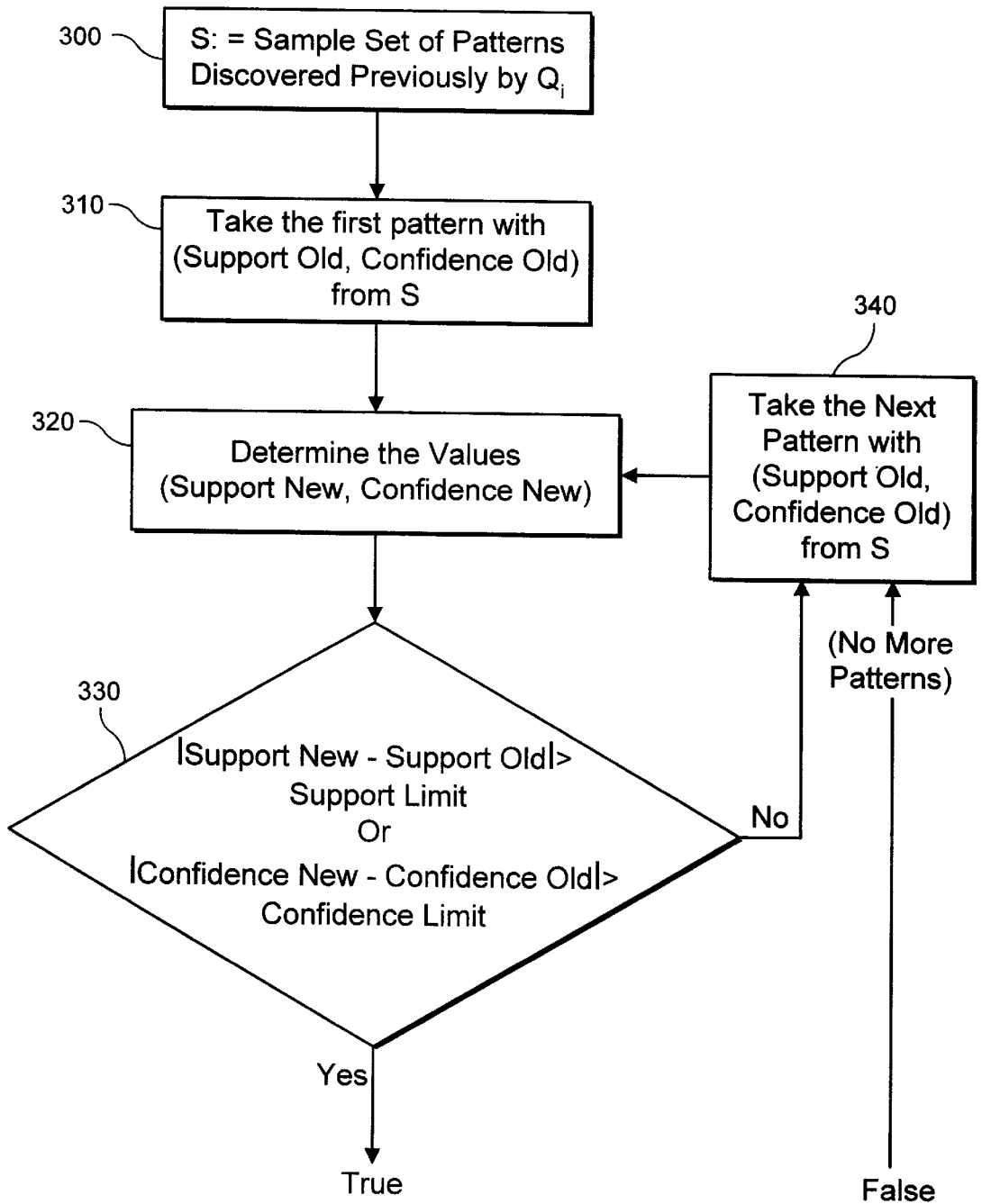
FIG. 4 is a flow chart depicting in greater detail the step of determining whether the condition of the database having changed substantially is satisfied as depicted in FIG. 3.

A more detailed description of Step 105 is depicted in FIGS. 3 and 4. The pattern discovery optimization element 6 consists primarily of periodically executing one or more extended triggers (also known as a Data-Monitoring and Discovery-Triggering constructs). See A. Tuzhilin and A. Silberschatz, "A belief-driven discovery framework based on data monitoring and triggering," Working Paper IS-96-26, New York University, Stren School of Business, December 1996. An extended trigger is depicted in FIG. 3. Extended Triggers are statements which (when translated into a lower machine level form) are executable by the processing device 1 of the computer system 9.

As depicted in FIG. 3, the extended triggers are made up of three clauses, WHEN 200, IF 201 and THEN 202. Thus the extended trigger may have the following form:
    WHEN the database changes
    IF the changes are "substantial"
    THEN execute a data mining query (or pattern template).

To implement Step 105, extended triggers are assigned to data mining queries (or pattern templates) assigned to the nodes of the action tree. Thus, given the above structure, the pattern discovery optimization element 6 ensures that data mining queries (pattern templates) are executed only in the event both the corresponding conditions in the WHEN clause AND the IF clause are satisfied (i.e., the database has changed and the changes are "substantial" with respect to the corresponding data mining query or pattern template, that is, will result in newly discovered patterns upon execution of the corresponding data mining query or pattern template).

Accordingly, the condition in the WHEN clause is satisfied whenever there is a periodic update of the database. For example, in a supermarket application, the condition may represent the daily recording of customer purchase information recorded in the central database. Thus, the WHEN clause condition will generally not depend on the data mining query (or pattern template) to which it is assigned. Instead, the WHEN clause will generally be the same for each extended trigger comprising the pattern discovery optimization element 6.

The body of the THEN clause consists of an executable form of the data mining query or pattern template to which it is assigned. Thus, execution of the THEN clause effects execution of the data mining query or pattern template to which the extended trigger is assigned.

The IF clauses of an extended trigger ensures that the data mining query (pattern template) corresponding to the extended trigger is not executed each time the database is updated. Rather, the IF clause in the extended trigger allows execution of the data mining query (pattern template) only if the database update resulted in "significant" changes to the data. Thus, on the one hand, newly emerging patterns of interest are generated whenever the database reflects such new patterns. On the other hand, computational resources are spared as data mining queries (pattern templates) assigned to nodes of the action tree are not executed unless their execution would result in some new set of patterns.

An issue arises however as to how to implement the IF clause portion of the extended trigger (i.e., in particular, how a "significant" or "substantial" change to the database is specified). One possibility is manual specification of the IF condition. Here, the database user will specify via user input device 7 and user interface element 4, again preferably in a high level language, the trigger for execution of the corresponding data mining query (pattern template) when the database changes. A drawback is that in that case, the user must have a thorough understanding of the dynamics of database changes as they relate to the data mining queries (pattern templates) assigned to the nodes of the action tree. Thus, the proper balance between ensuring discovery of newly emerging patterns of interest on the one hand, and sparing computational resources on the other, is dependant on the competency of the user. Furthermore, the user may have to specify many or complex triggers to ensure that proper balance.

Thus, a preferable way of determining whether substantial changes have occurred in the database (i.e., of specifying the trigger) is to do it automatically, without user involvement.

One potential way of automatically determining whether substantial changes have occurred in a database is for pattern discovery optimization element 6 to check a sample of previously discovered patterns and determine how much the discovered patterns have changed. For example, consider a data mining query assigned to some node of a previously built action tree. When the database changes, pattern discovery optimization element 6 samples some patterns previously discovered by the data mining query and checks the extent to which they have changed as a result of the database changes. If the sample patterns have changed substantially the query should be re-run. The process is then repeated for all queries assigned to nodes of the action tree.

This approach balances the need to save computational resources on the one hand, with the need to discover new patterns as quickly as they occur on the other, by using the statistical likelihood of substantial change to determine whether data mining queries are re-executed.

To be more specific, the IF clause may be implemented as follows. Assume the database has changed (i.e., the condition in the WHEN clause is satisfied). Then the pattern discovery optimization element 6 starts with the "first" node in the action tree. For that node, pattern discovery optimization element 6 chooses a "first" data mining query assigned to the node and selects a sample set of the patterns previously discovered by that data mining query. Any standard sampling technique may be used to implement pattern discovery optimization element 6 in this respect. See, e.g., S. Sudman, Applied Sampling, San Francisco: Academic Press, 1976. Then for each pattern in the sample set, pattern discovery optimization element 6 measures the change of pattern as a result of the newly added data. If the change in at least one of the patterns in the sample set is greater than some tolerance, then pattern discovery optimization element 6 re-executes this "first" data mining query. Otherwise, the data mining query is not executed. The pattern discovery optimization element 6 repeats this procedure for every each data mining query assigned to every node in the action tree.

An example will further illustrate implementation of the pattern discovery optimization element 6 and this procedure. In the supermarket illustration used throughout, the extended trigger used to implement the pattern discovery optimization element 6 may be as follows:

WHEN daily customer purchase information is recorded in the database
IF big_deviations_in_pattern_sampling(Qi)
THEN execute Qi where Qi is the current data mining query considered and big_deviations_in_pattern—sampling(Qi) is a procedure written in some programming language. One possible implementation of the procedure might be written as follows:

boolean big_deviations_in pattern_sampling (DM_query Qi) begin
  let S be a sample set of patterns discovered previously by Qi
  for each pattern with (SupportOld, Confidenceold) from S determine the values (SupportNew, ConfidenceNew)
    If |SupportNew—SupportOld|>SupportLimit OR |ConfidenceNew—ConfidenceOld|>ConfidenceLimit then
      return true
    return false
end where SupportOld and SupportNew are, respectively, the support for association rule in the database prior to the change and after the change. ConfidenceOld and ConfidenceNew are, respectively, the confidence in the association rule based on the database before and after the change. SupportLimit and ConfidenceLimit are tolerance levels representing the deviation necessary for execution of the data mining query (i.e. the boolean value "true" is returned).

This procedure is also depicted in a higher level, flow chart form in FIG. 4. Turning now to FIG. 4, in Step 300, a variable, S, is assigned a sample set of patterns discovered by Qi (the current data mining query) the last time Qi was executed.

In Step 310, the Support and Confidence values associated with a pattern in S are assigned, respectively, to the variables SupportOld and ConfidenceOld.

In Step 320, the Support and Confidence values associated with the pattern in light of the database changes are determined and assigned, respectively, to SupportNew and ConfidenceNew.

In Step 330, the change in the Support and Confidence values as a result of the database changes are compared with tolerance values. If either the change in Support or Confidence values exceeds their respective tolerances, the procedure returns true. Otherwise, in Step 340, the Support and Confidence values associated with another pattern in S are assigned, respectively, to the variables SupportOld and ConfidenceOld and processing resumes at Step 320.

Steps 320 through 340 are thus repeated until either the change in Support or Confidence values associated with a particular pattern exceed their respective tolerances, and the procedure returns true, or the procedure has circulated through the last pattern in S and returns false.

Thus, as should be clear to one skilled in the art, this procedure is written so that the THEN clause is triggered if at least one pattern from the sample set has been altered significantly (i.e. outside tolerance limits). Note that this implementation optimizes computational resources because determining support and confidence of an association rule is computationally inexpensive.

Other heuristics could be used as well. For example, pattern discovery optimization element 6 could re-execute data mining queries when sample pattern are altered significantly on average.

In addition, partial tree traversal represents another potential implementation of the pattern discovery optimization element 6. Here, only the nodes of the action tree specified by the user are traversed and, therefore, only those data mining queries assigned to those nodes are executed. For example, the user might specify individual nodes via user interface element 4 and user input device 7. In the alternative, the user might specify sub-trees (i.e. the user specifies a node of the tree and then the whole sub-tree rooted at the node is traversed).

The partial tree traversal approach can be used for applications in which there is not as great a need to keep patterns current. In that case, it makes sense to re-execute data mining queries only when the user specifies nodes for potential re-execution.

For instance, even if new data arrives frequently and affects patterns significantly it may not be necessary to take corresponding actions immediately. Consider the action "Determining how to arrange products in the store" assigned to a node of an action tree as illustrated in FIG. 5. While new data may arrive daily, and while the data changes may affect the actionable patterns assigned to the node, re-arrangement of products is usually done infrequently.

Finally, despite the foregoing detailed description of an embodiment of the present invention, it should be apparent that various modifications of this description could be made while remaining within the scope of the applicant's invention.

What is claimed is:

1. A computer based method for determining actionable patterns for a user of a database, the computer based method comprising the steps of:
   a. specifying an action hierarchy, the action hierarchy consisting of nodes, each of the nodes assigned an action; and
   b. for each node of the action hierarchy,
      i. specifying at least one corresponding pattern class, said at least one corresponding pattern class defining patterns which the user intends to act upon according to the action assigned to the corresponding node; and
      ii. assigning the at least one corresponding pattern class to the corresponding node.

2. The computer based method of claim 1, wherein the action hierarchy is arranged in the form of a tree.

3. The computer based method of claim 1, wherein the action hierarchy is arranged in the form of a directed acyclic graph.

4. The computer based method of claim 1, wherein step a is performed by a user.

5. A computer based method for generating and updating a group of files comprising patterns of data in a database, the data comprising facts of interest to user, the database being stored in a storage device of a computer system, the computer based method comprising the steps of:
   a. specifying a plurality of actions using a user input device and a user interface element;
   b. for each specified action of the plurality of actions,
      i. assigning at least one user-specified criteria to the action,
      ii. retrieving at least one of the patterns of data from the database based on the at least one user-specified criteria, and
      iii. assigning each of the retrieved patterns of data to the specified action.

6. The computer based method of claim 5, further comprising the step of:
   c. updating the database in the event the facts of interest to the user are changed.

7. The computer based method of claim 6, further comprising the step of:
   d. repeating steps iii, iv and v if the database changes.

8. The computer based method of claim 5, wherein the at least one user specified criteria is set forth using at least one data mining query.

9. The computer based method of claim 5, wherein the at least one user specified criteria is determined using one or more pattern templates.

10. The computer based method of claim 5, wherein the at least one user specified criteria is determined using a plurality of data mining rules.

11. The computer based method of claim 5, wherein step a includes the substep of:
   iv. assigning a storage location corresponding to the specified action.

12. The computer based method of claim 11, wherein step a includes the substep of:
   v. storing each of the retrieved patterns of data in the storage location corresponding to the specified action.

13. The computer based method of claim 5, wherein step b is performed by executing a plurality of extended triggers.

14. A computer based method for generating and updating a group of files comprising actions to be taken in response to emerging patterns of facts, the computer based method comprising the steps of:
   a. specifying a plurality of actions using a user input device and a user interface element;
   b. storing each specified action of the plurality of actions in one of at least one file directory; and
   c. organizing the at least one file directory in a storage device in a hierarchical structure.

15. The computer based method of claim 14, wherein the hierarchal structure includes a tree structure.

16. The computer based method of claim 14, wherein the hierarchical structure includes a directed acyclic graph.

17. A computer based method for generating and updating a group of files comprising patterns of data in a database, the data comprising facts of interest to a user, the database being stored in a storage device of a computer system, the computer based method comprising the steps of:
  a. specifying a plurality of actions using a user input device and a user interface element;
  b. for each specified action,
    i. storing the specified action in a file directory corresponding to the specified action;
    ii. retrieving at least one of the patterns of data from the database as a function of a user specified criteria,
    iii. assigning each of the at least one retrieved pattern to the specified action, and
    iv. storing each of the at least one retrieved pattern in the file directory corresponding to the specified action;
  c. periodically checking the database to determine if the database substantially changed; and
  d. repeating steps ii, iii and iv if the database is substantially changed.

18. The computer based method of claim 17, wherein the user specified criteria is determined using at least one data mining query.

19. The computer based method of claim 17, wherein the user specified criteria is determined using are set forth using at least one pattern template.

20. The computer based method of claim 17, wherein the user specified criteria is determined using a plurality of data mining rules.

21. The computer based method of claim 17, wherein step c is performed manually.

22. The computer based method of claim 17, wherein step c is performed automatically.

23. The computer based method of claim 17, wherein step b is performed by executing a plurality of extended triggers.

24. The computer based method of claim 23, wherein the extended triggers include WHEN, IF and THEN clauses.

25. The computer based method of claim 24, wherein the WHEN clause includes a condition indicating that the database is substantially changed.

26. The computer based method of claim 24 wherein the IF clause includes a condition indicating that the database is substantially changed.

* * * * *

UNITED STATES PATENT AND TRADEMARK OFFICE
CERTIFICATE OF CORRECTION

PATENT NO. : 6,292,797 B1
DATED : September 18, 2001
INVENTOR(S) : Tuzhilin et al.

It is certified that error appears in the above-identified patent and that said Letters Patent is hereby corrected as shown below:

Title page,
Item [56], References Cited, OTHER PUBLICATIONS, "Han et al.,"references, "Syetems" should read -- Systems --

Column 1,
Line 18, "*AAAI-94Workshop*" should read -- *AAAI-94 Workshop* --
Line 42, "(i.e," should read -- (i.e., --
Line 47, "arose," should read -- arisen, --
Line 60, "arose" should read -- arisen --

Column 2,
Line 2, "arose" should read -- arisen --

Column 3,
Line 33, "*" should be deleted

Column 6,
Line 33, "ChildrenAgre6to12," should read -- ChildrenAge6to12, --

Column 7,
Lines 6, 15, 18 and 60, ">" should read -- → --
Line 12, "dependancies" should read -- dependencies --
Line 42, "201" should be deleted Column 8,
Line 1, ">" should read -- → --
Line 18, "me" should read -- be --

Column 9,
Line 51, "dependant" should read -- dependent --

Column 10,
Line 38, "deviations_in_pattern—sampling" should read
-- deviations_in_pattern_sampling --
Line 41, "big_deviations_in_pattern_sampling" should read
-- big_deviations_in_pattern_sampling --
Line 42, "begin" should read -- ¶begin --
Line 46, "(Confidenceold)" should read -- (ConfidenceOld) --

UNITED STATES PATENT AND TRADEMARK OFFICE
CERTIFICATE OF CORRECTION

PATENT NO. : 6,292,797 B1
DATED : September 18, 2001
INVENTOR(S) : Tuzhilin et al.

It is certified that error appears in the above-identified patent and that said Letters Patent is hereby corrected as shown below:

Column 12,
Line 16, "to user," should read -- to a user, --
Lines 22, 37, 40 and 43, "criteria" should read -- criterion --
Line 26, "criteria," should read -- criterion, --
Line 35, "steps iii, iv and v" should read -- steps ii and iii --
Line 67, "hierarchal" should read -- hierarchical --

Column 13,
Line 12, "action;" should read -- action, --
Line 14, "criteria," should read -- criterion, --

Signed and Sealed this

Thirtieth Day of December, 2003

JAMES E. ROGAN
*Director of the United States Patent and Trademark Office*